United States Patent [19]

Newing, Jr. et al.

[11] 3,994,703

[45] Nov. 30, 1976

[54] METHOD AND APPARATUS FOR CONVEYING GLASS ALONG LOADING EQUIPMENT

[75] Inventors: Charles W. Newing, Jr., Toledo, Ohio; Robert H. Moore, Temperance, Mich.

[73] Assignee: Owens-Illinois, Inc., Toledo, Ohio

[22] Filed: June 2, 1975

[21] Appl. No.: 583,150

[52] U.S. Cl. .................................. 65/26; 65/170; 65/374 M; 252/22; 252/29
[51] Int. Cl.² .................................................. C03B 39/00
[58] Field of Search ............... 65/24, 26, 169, 170, 65/374 M; 252/12.2, 22, 29

[56] References Cited

UNITED STATES PATENTS

| | | | |
|---|---|---|---|
| 2,758,421 | 8/1956 | Smith | 65/26 |
| 2,873,555 | 1/1959 | Conrad | 65/26 |
| 3,198,616 | 8/1965 | Havens | 65/374 M |
| 3,347,650 | 10/1967 | Barkhau | 65/26 |
| 3,479,206 | 11/1969 | Patterson | 65/26 |
| 3,874,862 | 4/1975 | Bickling, Jr. et al | 65/169 X |
| 3,883,314 | 5/1975 | Schnyder et al | 252/12.2 |

FOREIGN PATENTS OR APPLICATIONS

| | | | |
|---|---|---|---|
| 522,019 | 2/1956 | Canada | 65/26 |
| 1,333,055 | 10/1973 | United Kingdom | |

OTHER PUBLICATIONS

*Solid Lubricants,* by Campbell, Loser & Sneegas, NASA, Wash. D.C., May 1966, pp. 7–17.

*Survey of Solid Lubricants Technology,* (Tech. Report) by Peter Martin, Jr., Industrial Applications Report, Aerospace Research, Research Application Center, U.S. Army Weapons Command, 1972, pp. 9–16.

*Survey of Solid Film Lubricants,* by D. B. McConnell, Wright Air Development Division, Proceedings of the Air Force, Navy Industry Propulsion Systems Lubricants Conference, Nov. 1960, pp. 113–127.

*Primary Examiner*—Arthur D. Kellogg
*Attorney, Agent, or Firm*—Robert F. Rywalski; E. J. Holler

[57] ABSTRACT

An improvement is provided in methods for conveying a charge, or gob, of formable glass along glass loading equipment, from the point of severance of the gob to the point where the charge of formable glass is discharged into a mold for forming; the improvement essentially resides in increasing the effective glass contacting life of lubricants, which have been previously employed on the glass loading equipment, by providing a support coating for the previously employed lubricants, which support coating comprises a transition metal in a major amount applied from a flame spray or plasma spray and presents an abrasion-resistant, rough surface profile upon which the previously employed lubricants are then deposited.

12 Claims, No Drawings

METHOD AND APPARATUS FOR CONVEYING GLASS ALONG LOADING EQUIPMENT

THE INVENTION

The present invention is directed to the art of glass manufacturing and, more particularly, is directed to the art of conveying a charge of formable glass, or glass gob, from the point of its severance from a molten pool of glass to the point of its entry into a glass forming mold. More specifically, the present invention is directed to improvements in methods for conveying a charge of formable glass upon loading equipment which carries a solid film glass lubricant layer thereon.

In the art of glass manufacturing molten glass is generally stored in a forehearth having a feeder, which feeder is provided at its bottom with an opening whereby the formable glass may discharge under the influence of a reciprocating plunger. As the glass issues through this opening it is typically severed from the main body of the glass by appropriate shears. This charge of formable glass, or, as it is sometimes referred to, a glass gob, is then conveyed from its point of severance by the shears to an appropriate glass forming mold over, and along, what is generally referred to in the art as loading equipment. The conveying of the charge of molten glass over the loading equipment is typically accomplished under the influence of gravity. The loading equipment, in general, includes a member, which may be referred to as a deflector or a scoop, which serves to intercept the falling sheared gob and guide it into a chute or trough member. In passing it should be mentioned that occasionally the deflector and the scoop are considered to be part of the chute or trough itself. This chute, or trough, presents in its cross section an arcuate configuration which defines a track along which the glass charge is gravitationally conveyed in the direction of a suitable glass forming mold. The gob, or charge of formable glass, is then, in turn, guided into the mold by what is typically referred to in the art as a funnel or a deflector.

Important considerations are involved in conveying the gob or charge of formable glass from its point of severance to the mold. First, the time of travel must be constant in order to insure efficient and uniform operation. Second, the shape of the gob must not be significantly altered during the travel along the chute as such alteration may cause distortion in the finished article. Third, the surface of the glass charge must not become chilled or contaminated; otherwise, the quality of the finished article will not be suitable.

If chutes for conveying the glass are plain metal, and what is typically employed for the loading equipment is either iron or aluminum, the hot gob or charge of formable glass has a tendency to become adhered to the loading equipment, resulting in either a failure to travel to the mold or a distortion in the shape of the gob. Either, or both of these situations are, obviously, unacceptable. As a result it has been common practice to lubricate the loading equipment by either intermittent or continuous application of oil, or oil base dopants. Such a treatment of the loading equipment facilitates the passage of the glass but it is only temporary and necessitates frequent, or continuous, application of the oil or dopant. In spite of such continued application, the time of travel of the gob or charge of formable glass is erratic. In addition, oil causes environmental pollution and has a tendency to form deposits on the gob which remain in the finished article.

Because of the problems which exist in the foregoing type of lubrication, attempts have been made to solve this problem so as to provide a method of conveying formable glass charges along the loading equipment which method will provide a high quality product with minimum contamination of the adjacent environment and which method is conductive to a high production rate and low cost operation. Proposals have been made for providing an improved technique for conveying formable glass charges along the loading equipment by providing the loading equipment, at least along a portion thereof which is in a glass contacting location, with a solid firm glass lubricant layer which typically comprises effective lubricating amounts of a lubricating pigment dispersed in a polymeric binder. Such proposals are exemplified by U.S. Pat. No. 2,873,555, U.S. Pat. No. 2,758,421, and U.S. Pat. No. 3,479,206 which patents are hereby incorporated by reference, especially with regard to their description of the loading equipment. In addition to the teachings of these patents proposals have been made that the loading equipment be provided with a solid film lubricant layer of a suitable lubricating pigment, such as, for example graphite, dispersed in a binder system which is a cured, hard, thermoset organopolysiloxane and which organopolysiloxane can, optionally, include other materials such as, for example, effective cure promoting amounts of a siloxane cure promoter, for example, melamine formaldehyde partial condensate resins. The latter term includes the lower akylated melamine formaldehyde partial condensate resins such as, for example, the $C_1$–$C_5$ alkylated melamine formaldehyde partial condensate resins.

The proposals referred to immediately above have tended to minimize some of the problems but, nonetheless, are deficient with respect to their glass-contacting, or effective, life. Thus, in themselves these proposals do not solve the problem or satisfy the need in the art for a lubricating technique, in conveying the charges of formable glass along loading equipment, which technique is compatible with and conducive to a high speed, low cost operation for producing high quality wear with minimal, if any, undesirable pollution.

Thus, the object of this invention is to effectively increase the glass contacting, lubricating life of the foregoing described solid film glass lubricant layers which have been employed on glass loading equipment so as to solve the problems and satisfy the needs in the art with respect to conveying formable glass charges along loading equipment.

In accordance with this invention, there is provided an improvement in prior art processes for forming glass articles comprising conveying a charge of formable glass over loading equipment to a forming mold and wherein at least a portion of the loading equipment carries, at a location which is in contact with the conveyed glass charge (glass contacting location), a solid film glass lubricant layer comprising effective lubricating amounts of a lubricating pigment dispersed in a polymeric binder; the improvement essentially resides in increasing the effective lubricating life of the solid film glass lubricant layer by supporting said solid film lubricant layer on the base metal of the loading equipment with a textured, or rough, support coating of a metal, i.e., the support coating of the metal is disposed intermediate the solid film lubricant layer and the base metal of which the loading equipment is fabricated.

In accordance with another feature of this invention, there is provided an improvement in prior art glass gob delivery chutes comprising a first, or base, metal surface of the chute and a solid film glass lubricant layer carried by said base metal surface which lubricant layer comprises, for example, graphite dispersed in a cured, thermoset polymer; the improvement resides in employing a supporting-metal layer for the solid film lubricant which layer is disposed intermediate the first metal surface, i.e., the base metal surface of which the chute is fabricated, and said solid film lubricant layer. The supporting metal layer for the solid film lubricant is carried by a conventional delivery chute and has a rough surface to which the glass lubricant layer is attached. That is, the delivery chute instead of being a laminated structure of two layers, i.e., the metal of the chute, or delivery equipment, and the solid film glass lubricant layer, will now be a laminate in which there is also provided intermediate the metal of the chute, or delivery equipment, and the solid film lubricant layer, a supporting layer of a metal for the solid film lubricant which supporting layer will have a roughened surface upon which the solid film lubricant layer is carried and which layer is formed by flame spraying or plasma spraying.

In accordance with another feature of this invention, there is provided an improvement in prior art methods for forming glass loading equipment comprising applying onto a glass contacting metal member, for example a chute, a dispersion of a lubricating pigment, preferably graphite, in a curable thermosettable polymer and then curing the polymer to a thermoset condition so as to bind the lubricating pigment therein and form a solid film, glass lubricant layer on the glass contacting metal member; the improvement comprises increasing the effective lubricant life of said layer by applying onto the surface of the metal member, prior to the application of the dispersion of the lubricating pigment in the curable, thermosettable polymer, a transition metal in a high energy spray so as to form a metal layer on the member, e.g. a chute, which layer has a rough surface and serves as a support layer for the subsequently applied solid film lubricant layer. The use of such glass loading equipment as provided herein for conveying severed glass to a mold provides unexpectedly increased effective lubricating lives.

In *Solid Lubricants* by Campbell, Loser & Sneegas, NASA, Washington, D.C., May, 1966 at pages 7–17 bonded, solid lubricants are discussed and, more specifically, pretreatments such as, for example, vapor or grit blasting, phosphating, sulfiding, anodizing etching, and the use of dichromates and chemical films are disclosed. There is no recognition or disclosure of the present invention concept, however, therein. Also in this respect reference may be had to *Survey of Solid Film Lubricants* by D. B. McConnell, Wright Air Development Division, Proceedings of the Air Force-Navy-Industry Propulsion Systems Lubricants Conference, November 1960, pages 113 to 127. In *A Survey of Solid Lubricant Technology* (Technical Report) by Peter Martin, Jr., Industrial Applications Report, Aerospace Research Application Center, U.S. Army Weapons Command, 1972 at, for example, pages 9 and 16, plasma spraying is disclosed. There is no recognition, however, or teaching of the present invention therein. Processes involving flame spraying and processes involving flame spraying or plasma spraying, in order to obtain equipment used in glass manufacture, are disclosed in U.S. Pat. No. 3,347,650 and in British patent specification No. 1,333,055. There is, however, in neither of these references any recognition of the problem solved by applicants and there is no teaching or suggestion, in either of these references, as to how the present problem may be solved.

As previously indicated the art of conveying charges of formable glass from the point of severance, by shears, to the point of entry into an appropriate glass forming mold has been practiced by employing loading equipment which may be considered to have been of a laminated two layer structure. Essentially the present invention provides improvements in the effective life of such loading equipment by providing, intermediate the metal base of the loading equipment and the solid film lubricant layer, a layer of a metal. This intermediate metal layer has a rough or textured surface and serves as a support layer for the solid film lubricant layer; the complementary action of the provided intermediate supporting layer and the solid film lubricant layer, which is bonded thereto, enhances and provides superior and longer effective life for such glass loading equipment.

In order to obtain most desirable results the metal support layer will be applied onto a cleaned surface of a conventional glass loading equipment member, e.g., an aluminum or iron chute, and subsequent to the formation of the supporting metal layer thereon the solid film glass lubricant layer will be applied thereto using the techniques previously employed for forming such layers. Most desirably the cleaning of the glass loading equipment will be done by baking that equipment, so as to burn off undesirable organic residuals, and then subsequently grit blasting the surface. The supporting metal layer is then applied onto the metal portion of the glass loading equipment in a high energy spray. As used herein high energy spray means a flame spray or plasma spray both of which are conventional and are per se well known in the art. The metal which is applied to form the support layer will be a hard metal and will, desirably, exhibit less glass wetting than the base metal of the glass loading equipment. The hardness of the support metal layer is not critical and, in general, it may be stated that the harder the metal the greater will be the realized increase in life of the delivery equipment. Preferably the metal will have a melting point greater than about 1700° F.. Preferred metals are the transition metals i.e., those appearing to the right of the Group IIA elements and to the left of the Group IIIA elements of the periodic chart; i.e., those metals appearing in Groups IIIB, IVB, VB, VIB, VIIB, VIIIB, IB and IIB, mixtures thereof and alloys thereof in which the alloy is at least about 50% by weight, and preferably at least about 60% by weight, of at least one of said transition metals. Especially preferred metals are nickel and chromium with a most desirable material being an alloy of about 60 to about 95% nickel and about 0.5 to 18% chromium; the balance being ingredients, or adjuvants, present as processing aids, for example fluxing agents, to enhance the known use of these materials in plasma or flame spray applications. Additionally, the metals which are applied by the high energy spray, i.e., plasma spray or flame spraying will desirably include transition metal carbides and/or transition metal nitrides in small quantities which are sufficient to enhance the hardness. Typically the amounts of these carbides and/or nitrides when present will be on the order of about 2% by weight to about 18% by weight. Thus particularly preferred materials for the support metal layer will include about 60 to about 95% (wt.) nickel, about 0.5 to about 18% chromium, about 2-18% of at least one transition metal carbide or nitride and the balance being conventional processing aids. These materials are well known and widely commercially available. One especially suitable material is that supplied commercially by Eutectic Castolin Institute, Flushing, N.Y. under their designation Diamax 19112 and is a material of about 61% Ni and 7% Cr and about 12% by weight of Tungsten carbide; the balance by analysis shows the presence of aluminum and boron and also small amounts of calcium, magnesium, manganese iron, lead, silicon and titanium but the precise chemical species, i.e., whether elemental or combined as for example an oxide was not determined. As indicated the flame spraying and plasma spray techniques are per se well known in the art and such techniques will be routinely employed herein. Conventional flame sprayable and conventional plasma sprayable transition metals, as indicated above, will be employed in the flame spray or plasma spray application respectively. When using flame spray techniques it is generally preferred to apply the supporting metal coating by means of commercially available oxyacetylene torches designed of flame spray fine particulate materials. Other flames such as, for example, oxyhydrogen flames, can equally be employed. The techniques utilized for plasma spray application are based on ionized gas plasma and equipment for plasma spraying particulate materials may be procured from numerous suppliers. In passing, it is generally preferred that the particle size transition of the metal-containing material employed for forming the support layer be generally in the size range of about 1000 microns to about 500 microns.

When metals of the type contemplated herein are sprayed onto a metal surface by means of a flame spray or plasma spray i.e., the application of the metal in a high energy spray, the particles coalesce an form adherent layer on the base metal which inherently is defined by a rough or textured surface profile. This rough surface is employed as is, i.e., no direct attempts are made to provide a smoother surface profile to the support metal such as, for example, as might be accomplished by application of additional heat to get better flow or such as, for example, by machining the surface. This surface typically has a roughness on the order of about 500–600 microinches (arithmetic average) and may generally be considered as being a surface possessed of mountains and valleys. The nature of this flame sprayed or plasma sprayed metal support layer with its hardness and surface profile of mountains and valleys complements and apparently interacts with the solid film lubricant layer to provide highly improved effective operating life for glass loading equipment.

In passing, it should be mentioned that in some instances it may be desirable to treat the surface of the metal base portion of the glass loading equipment prior to application of the metal support layer thereon so as to enhance the bonding of the support layer to the base metal. Conventional techniques may be employed in this regard.

As previously indicated, after the support metal layer has been applied and formed onto the base metal of the glass loading equipment there is then applied to the support metal layer, in a manner per se previously done, a solid film glass lubricant layer. That layer is composed of a binder and effective lubricating amounts of a lubricating pigment. Exemplary of these pigments are graphite and molybdenum disulfide with graphite being especially highly preferred. Polymeric materials are employed to function as the binder for the graphite, or other lubricating pigments. Particularly preferred binders are the curable, thermosettable polymers. Thus, for example, graphite, is applied in admixture with a polymer, preferably a curable, thermosettable polymer, in a suitable liquid vehicle onto the surface of the supporting, flame sprayed or plasma sprayed, metal layer. The vehicle is evaporated and the pigment and polymer formed into a homogeneous film by curing the curable, thermosettable polymer which effects the binding of the lubricating pigment therein. The curing may be done by heating at a temperature and for a time sufficient to cure to a hard thermoset state or the polymer may be cured with an appropriate catalyst without heating. The application of the lubricating pigment along with the polymer can be done by conventional techniques such as brushing, spraying, or flow coating. The lubricant pigment will be used in an effective lubricating amount. Suitable results will be obtained by employing a weight ratio of lubricating pigment to polymer on the order of about 0.8:1 to about 2:1 and, for example, if graphite is employed quite desirable results will be obtained using a weight ratio between about 1:1 to about 1.75:1. The polymers which are employed as a binder for the lubricating pigments are conventional and well known in the art. Exemplary of suitable thermosettable polymers are silicones, phenoplasts, melamine formaldehydes (including alkylated melamine formaldehydes), epoxides and inorganic phosphates. Particularly preferred materials are the phenoplasts and the organopolysiloxanes. Preferably when the phenoplasts or organopolysiloxanes are employed the solid film lubricant layer will be formed by applying, preferably by spraying a dispersion of the lubricating pigment, for example, graphite, in an organic solvent solution of a further-curable, thermosettable phenoplast or organopolysiloxane. Additionally, the dispersion can include, as is well known, suitable adjuvants such as, for example, thixotropes and the like which are employed to adjust the dispersion to a desired flow depending on the nature of the application technique and it can likewise include effective cure promoting amounts of conventional cure promoters for the polymers employed. Exemplary of suitable cure promoters are the melamine formaldehyde partial condensate resins including, for example, the alkylated, i.e., lower alkylated, for example, $C_1$–$C_5$ alkylated melamine formaldehyde partial condensate resins, such as for example, butylated melamine formaldehyde partial condensate resins. Typically the cure promoters will be used in an amount of less than about 15% by weight based on the polymer solids. The phenoplasts which are employed are well known in the art and are the partial condensate products of phenol and aldehydes and especially phenol and formaldehyde. These further-curable, thermosettable phenolaldehyde resins are widely available from numerous suppliers. Similarly the further-curable, thermosettable organopolysiloxanes which are employed are likewise well known in the art, and are widely available commercially. Typically these materials will be hydrolysis and condensation products of monoalkyltrifunctionalsilanes and/or monophenyltrifunctionalsilanes, or condensation and hydrolysis products of mixtures of monoalkyltrifunctionalsilanes, and/or monophenyltrifunctionalsilanes, with dialkyldifunctionalsilanes, and/or diphenyldifunctionalsilanes. The alkyl referred to above will generally be a lower alkyl for example, a $C_1$-$C_3$ alkyl with methyl being particularly preferred. Reference in the above with regard to difunctional and trifunctional silanes means that the silanes in the case of difunctionality will have two hydrolyzable groups thereon and, similarly, a trifunctional silane will have three hydrolyzable groups thereon. As is well known these hydrolyzable groups are typically the halide groups, for example, chloride groups, as well as the alkoxy groups, for example, the alkoxy groups wherein the alkyl portion has from one up to about 5 carbon atoms, with ethoxy being especially preferred. One especially suitable further-curable, thermosettable organopolysiloxane is a methylphenylsiloxane having an R:Si ratio on the order of about 1.4, the R:Si ratio, as is known in the art, being the ratio of the organic moieties directly bonded to silicon atoms, and highly desirable results will be obtained using a mole ratio of methyl to phenyl radicals on the order of about 3:1 to 4:1. In making up an organic solvent solution of the thermosettable, further-curable polymer a wide variety of solvents may be employed including alkanes, aromatic solvents, ethers, alcohols, esters, and the like; for example, xylene typically produces quite satisfactory results. The concentration of the further-curable, thermosettable polymers in the organic solvent solution may vary over a wide range with suitable results being obtained using a concentration of between about 10 to about 60% by weight of curable-thermosettable polymer solids (based on solvent and polymer solids only) and quite desirable results being obtained by utilizing about 25 to about 55% by weight of the thermosettable, further-curable polymer. The curing of the further-curable, thermosettable polymers to their cured, thermoset hard, condition will be done under conditions of time and temperature which are conventional in the art for effecting these purposes.

While the above describes the present invention with sufficient particularity to enable those skilled in the art to make and use same, and generally sets forth some of the best modes contemplated, there nonetheless follows a representative example which will even yet more clearly allow those skilled in the art to make and use the present invention, The glass loading equipment which was employed was a conventional chute or trough which is U-shaped in cross section and the base metal of which was iron, although other metals, e.g. aluminum would be equally satisfactory. The chute was first passed through a conventional glass annealing lehr whereby it was heated to effect a baking off of residual organics on the surface. The glass contacting surface of this chute was then conventionally grit blasted and a primer, or bond, coat of an alloy of nickel and chromium in an amount of about 0.5 parts chromium and 92.6 parts by weight nickel was flame sprayed from an oxyacetylene spray onto the grit blasted surface. Sufficient material was applied until it just barely became visible. Subsequently there was applied, onto the primed substrate, the transition metal support layer for the solid film lubricant. This support metal was an alloy of 61 parts nickel and about 7 parts chromium and included tungsten carbide which functions to increase the hardness of the support layer. The amount of tungsten carbide was generally on the order of about 12 parts by weight. The nickel-chromium alloy which was applied initially as the prime coat is available from Eutectic Castolin Institute under their designation Xuperbond and the nickel-chromium alloy containing the tungsten carbide, used as the support layer, was obtained from Eutectic Castolin Institute as their designation Diamax 19112. Immediately prior to the flame spraying of the support layer onto the chutes, the latter had been heated in the temperature range of about 200° to about 500° F., and hence were generally in this temperature range during flame spraying. The flame spraying of the material to form the support layer was done to produce a textured or rough coating having a depth of about 0.012 inch employing a Roto-Tec flame spray gun also available from the above noted supplier. The solid film lubricant was prepared by admixing a further-curable, thermosettable organopolysiloxane (R:Si ratio of about 1.40:1, methyl:phenyl ratio of about 3.60:1 manufactured from a mixture of phenyltriethoxysilane, methyltriethoxysilane, and dimethyldiethoxysilane) along with an organic solvent, which in this instance was xylene with the amount of organopolysiloxane being such as to form a solution of about 50% by weight organopolysiloxane. There was then combined into that solution particulate graphite (obtained from Asbury Graphite Mills, Inc. under their designation A-98) with the amount of graphite employed being in a weight ratio to the organopolysiloxane solids of about 1.5:1. Additionally, there was employed as a cure promoter (about 5% by weight of the siloxane) a butylated melamine formaldehyde supplied commercially by Koppers Chemical Company under their designation Koprez 70–10. The material was sprayed onto the support coating to form a solid film glass lubricant layer which overcovers the support layer and had a thickness of about 0.014 inches. Curing of the organopolysiloxane was effected by heating at a temperature of about 600° F. for about 1 hour. The glass delivery chute so formed having the solid film glass lubricant layer supported by the intermediate transition metal layer was then employed in a glass manufacturing facility to gravitationally convey glass gobs from the shears to a blank mold. Typical life times which were obtained were greater than 2 months and it will be readily appreciated, by those skilled in the art, that this is indeed quite significant.

While the foregoing describes the invention it will, of course, be apparent that modifications are possible which according to the patent laws and statutes do not depart from the spirit and scope of the present invention.

We claim:

1. In a process for forming glass articles comprising conveying a charge for formable glass over loading equipment to a forming mold and wherein at least a portion of said loading equipment carries, at a formable glass contacting location thereon, a solid film glass lubricant layer comprising a lubricant pigment dispersed in a polymeric binder, the improvement comprising increasing the effective lubricating life of said layer by supporting said layer on said loading equipment with a textured support coating of a transition metal applied to said loading equipment in a high energy spray said layer being in direct contact with said textured support coating.

2. The improvement of claim 1 wherein said support coating is formed on said loading equipment by flame spraying.

3. The improvement of claim 2 wherein said metal is nickel.

4. The improvement of claim 3 wherein tungsten carbide is sprayed along with said transition metal.

5. The improvement of claim 1 wherein said metal is formed on said loading equipment by plasma spraying.

6. In a glass gob delivery chute comprising a first metal surface carrying a solid film glass lubricant layer comprising graphite dispersed in a cured, thermoset polymer the improvement comprising a transition metal support layer for said solid film lubricant disposed intermediate said first metal surface and said glass lubricant layer, said supporting metal layer having a rough surface and being applied from a high energy spray, said glass lubricant layer being in direct contact with said supporting metal layer.

7. The improvement of claim 6 wherein said transition metal layer comprises at least about 50% by weight of a transition metal and 0 to about 18% by weight of at least one transition metal carbide or transition metal nitride.

8. The improvement of claim 7 wherein said carbide is tungsten carbide.

9. In a method for forming glass loading equipment comprising applying unto a metal member a dispersion of graphite in a curable thermosettable polymer and then curing said polymer to a thermoset condition so as to bind said graphite therein and form a solid film glass lubricant layer on said metal member, the improvement comprising increasing the effective lubricant life of said layer by applying unto said metal member in a high energy spray, prior to said application of said graphite dispersion, a metal comprising a major amount of a transition metal and then applying said graphite dispersion directly onto said layer.

10. The improvement of claim 9 wherein said high energy spray is a flame spray.

11. The improvement of claim 9 wherein said high energy spray is a plasma spray.

12. In a method of forming glass comprising conveying formable glass over loading equipment to a glass forming mold and then forming said glass in said forming mold, the improvement wherein said loading equipment is produced in accordance with the method of claim 9.

* * * * *